United States Patent
Beall et al.

(10) Patent No.: US 7,772,362 B2
(45) Date of Patent: Aug. 10, 2010

(54) TREATMENT METHOD FOR IMPARTING SELF-HEALING AND SHAPE MEMORY PROPERTIES TO CERTAIN CBDO COPOLYMERS

(75) Inventors: Gary W. Beall, San Marcos, TX (US); Jesse R. Hancock, Austin, TX (US); Chad J. Booth, San Marcos, TX (US)

(73) Assignee: Texas State University, San Marcos, TX (US)

( * ) Notice: Subject to any disclaimer, the term of this patent is extended or adjusted under 35 U.S.C. 154(b) by 0 days.

(21) Appl. No.: 12/173,186

(22) Filed: Jul. 15, 2008

(65) Prior Publication Data

US 2009/0023891 A1    Jan. 22, 2009

Related U.S. Application Data

(60) Provisional application No. 60/959,518, filed on Jul. 16, 2007.

(51) Int. Cl.
*C08F 6/00* (2006.01)

(52) U.S. Cl. ............... 528/502 R; 528/480; 528/502 B; 528/502 C; 528/503; 528/271; 528/272; 528/307; 528/444; 521/134; 525/444

(58) Field of Classification Search ............... 528/271, 528/272, 307, 480, 502 R, 502 B, 502 C, 528/503; 521/84.1, 134, 136; 522/90, 92, 522/93, 96; 524/417; 52/84.1, 134, 136, 52/417; 525/444

See application file for complete search history.

(56) References Cited

U.S. PATENT DOCUMENTS

| | | | |
|---|---|---|---|
| 5,256,758 A | 10/1993 | Kuo | |
| 5,705,575 A | 1/1998 | Kelsey | |
| 6,037,424 A | 3/2000 | Scott | |
| 6,120,889 A | 9/2000 | Turner et al. | |
| 6,242,558 B1 | 6/2001 | Kelsey | |
| 6,287,656 B1 | 9/2001 | Turner et al. | |
| 6,657,044 B1 | 12/2003 | Kelsey et al. | |
| 7,169,860 B2 | 1/2007 | Bastioli | |
| 7,193,029 B2 | 3/2007 | Hayes | |
| 2006/0229430 A1 | 10/2006 | Turner et al. | |
| 2006/0287493 A1 | 12/2006 | Crawford et al. | |
| 2006/0287494 A1 | 12/2006 | Crawford et al. | |
| 2006/0293495 A1 | 12/2006 | Crawford et al. | |
| 2007/0232778 A1 | 10/2007 | Moody et al. | |
| 2007/0276065 A1 | 11/2007 | Barton et al. | |

FOREIGN PATENT DOCUMENTS

| | | |
|---|---|---|
| EP | 0745628 | 4/1996 |
| WO | WO03008477 A1 | 1/2003 |

OTHER PUBLICATIONS

Booth et al, 2006, Polymer, 47(18), 6398-6405 Hard copy available Aug. 23, 2006, available online Jul. 24, 2006.*

Booth, Chad J. et al., "Copolyterephthalates containing tetramethylcyclobutane with impact and ballistic properties greater than bisphenol A polycarbonate," Polymer, vol. 47, Issue 18, Aug. 23, 2006.

Londa, Dr. Michelle, "Nanocomposites: New Materials and New Paradigms," Nanotechnology Colloquium presentation and video conference, Jan. 22, 2007, http://www.nanotxstate.org/20070122_event.htm.

* cited by examiner

*Primary Examiner*—Ling-Siu Choi
*Assistant Examiner*—Frances Tischler
(74) *Attorney, Agent, or Firm*—Meyertons, Hood, Kivlin, Kowert & Goetzel, P.C.; Eric B. Meyertons

(57) ABSTRACT

A method of treating an amorphous CBDO polymer to impart self healing and shape memory properties by heat treatment, and products resulting from such method are described. An amorphous CBDO copolymer may include a copolyester prepared by reacting an aromatic dicarboxylic acid or ester or anhydride thereof, a 2,2,4,4-tetraalkyl-1,3-cyclobutanediol and 1,3-propanediol, 1,4-butanediol, or mixture thereof. The method may include heating said copolymer to a temperature above its glass transition temperature to impart self healing and shape memory properties.

10 Claims, No Drawings

TREATMENT METHOD FOR IMPARTING SELF-HEALING AND SHAPE MEMORY PROPERTIES TO CERTAIN CBDO COPOLYMERS

CROSS-REFERENCE TO RELATED APPLICATIONS

This application claims priority pursuant to 35 U.S.C. 119 to provisional U.S. Patent Application Ser. No. 60/959,518 entitled "SELF-HEALING AND SHAPE MEMORY IN CBDO COPOLYMERS," filed Jul. 16, 2007.

Commonly assigned U.S. application Ser. No. 11/173,314 filed on even date herewith also relates to amorphous polyester copolymers compositions.

This application hereby incorporates by reference U.S. Pat. No. 5,705,575, issued Jan. 6, 1998, in its entirety.

GOVERNMENT LICENSE

The U.S. Government has a paid-up license in this invention and the right in limited circumstances to require the patent owner to license others on reasonable terms as provided for by the terms of Contract No. NAVAIR N68335-07-C-0040 awarded by the United States Naval Air Systems Command.

REFERENCES CITED

This application hereby incorporates by reference the following U.S. patents:

| Patent No. | Issue Date | Title |
|---|---|---|
| 7,193,029 | Mar. 20, 2007 | Sulfonated Copolyetherester Compositions from Hydroxyalkanoic Acids and Shaped Articles Produced Therefrom |
| 7,169,860 | Jan. 30, 2007 | Amorphous-crystalline Block Copolymers |
| 6,657,044 | Dec. 2, 2003 | Process For Making Polytrimethylene Terephthalate |
| 6,287,656 | Sep. 11, 2001 | Low Melt Viscosity Amorphous Copolyesters Having Improved Resistance to Lipids |
| 6,242,558 | June 5, 2001 | Modified Polytrimethylene Terephthalate |
| 6,120,889 | Sep. 19, 2000 | Low Melt Viscosity Amorphous Copolyesters With Enhanced Glass Transition Temperatures |
| 6,037,424 | Mar. 14, 2001 | Clear Blends of Polycarbonates And Polyesters |
| 5,705,575 | Jan. 6, 1998 | Copolyester Composition |
| 5,256,758 | Oct. 26, 1993 | Thermosetting Coating Compositions |

This application hereby incorporates by reference the following U.S. Patent Application Publications:

| Patent No. | Publication Date | Title |
|---|---|---|
| 2007/0276065 | Nov. 29, 2007 | Process For the Preparation of Copolyesters Based on 2,2,4,4-tetramethyl-1,3-cyclobutanediol And 1,4-Cyclohexanedimethanol |
| 2007/0232778 | Oct. 4, 2007 | Certain Polyester Compositions Which Comprise Cyclobutanediol, Cyclohexanedimethanol, and High Trans-cyclohexanedicarboxylic Acid |
| 2006/0293495 | Dec. 28, 2006 | Polyester Compositions Containing Cyclobutanediol Having a Certain Combination Of Inherent Viscosity and Moderate Glass Transition Temperature And Articles Made Therefrom |
| 2006/0287494 | Dec. 21, 2006 | Polyester Compositions Containing High Amounts of Cyclobutanediol and Articles Made Therefrom |
| 2006/0287493 | Dec. 21, 2006 | Thermoformed SHEET(S) Comprising Polyester Compositions Which Comprise Cyclobutanediol |
| 2006/0229430 | Oct. 12, 2006 | Amorphous Copolyesters |

This application hereby incorporates by reference the following foreign patent applications:

| Publication No. | Publication Date | Title |
|---|---|---|
| WO 03008477 | Jan. 30, 2003 | Amorphous Copolyesters |
| EP 0745628 | Apr. 12, 1996 | Copolyester Composition |

Publications of interest:

| Author | Title/Publication |
|---|---|
| Booth, Chad J. et al | Copolyterephthalates containing tetramethylcyclobutane with impact and ballistic properties greater than bisphenol A polycarbonate, Polymer, Volume 47, Issue 18, Aug. 23, 2006, pp. 6398-6405. |
| Behl, Marc et al. | Shape-memory Polymers, Materials Today, April 2007, Volume 10, No. 4, pp. 20-28. |
| Beall, Gary W. et al | Physical properties of CBDO based copolyterephthalate nanocomposites, Applied Clay Science, Volume 37, Issues 3-4, September 2007, pp. 295-306. |
| Londa, Dr. Michelle | Nanocomposites: New Materials and New Paradigms, Nanotechnology Colloquium presentation and video conference, Jan. 22, 2007, http://www.nanotxstate.org/20070122 event.htm |

BACKGROUND OF THE INVENTION

This invention relates to amorphous polyester copolymer compositions, as disclosed in U.S. Pat. No. 5,705,575, which surprisingly have self healing and shape memory properties. There is a need for materials with such properties, and this invention is a treatment method for imparting self healing and shape memory properties to said amorphous copolyester copolymers (hereinafter referred to as CBDO copolymer(s)) of said U.S. Pat. No. 5,705,575.

BRIEF DESCRIPTION OF THE INVENTION

A method has been discovered for treating an amorphous CBDO copolymer as described in U.S. Pat. No. 5,705,575 incorporated by reference above which comprises heating said copolymer to a temperature above its glass transition temperature. At this temperature, dents, bends, scratches, and other deformations will disappear, and the copolymer will return to its original shape and condition.

DETAILED DESCRIPTION OF THE INVENTION

Applicants have discovered that compositions made according to U.S. Pat. No. 5,705,575 will display self healing and shape memory properties when undergoing treatment which involves heating the CBDO polymer to a temperature above its glass transition temperature. This discovery is unexpected since the CBDO polymer is an amorphous linear polymer with no crosslinks. The article by Behl et al. that reviews the current knowledge about shape memory polymers points out two main mechanisms that lead to shape memory. These include crosslinking and crystalline domains that act like crosslinks, neither of which exist in the CBDO polymer.

In some embodiments, a copolyester copolymer may include a copolymer that includes cyclobutanediol (a "CBDO copolymer"). In some embodiments, a CBDO copolymer may be prepared by reacting an aromatic dicarboxylic acid or ester or anhydride thereof, a 2,2,4,4-tetraalkyl-1,3-cyclobutanediol and 1,3-propanediol, 1,4-butanediol, or mixture thereof. The reagents may be reacted with one another under polymerization conditions.

In some embodiments, aromatic dicarboxylic acids may include one or more aromatic $C_{8-22}$ dicarboxylic acids (e.g., terephthalic acid, isophthalic acid, phthalic acid and 2,6-naphthalene dicarboxylic acid). Aromatic dicarboxylic esters may include dimethyl, diethyl and dipropyl diesters. Aromatic dicarboxylic acid anhydrides may include phthalic anhydride. In some embodiments, reagents may include Terephthalic species such as dimethyl terephthalate and terephthalic acid.

In some embodiments, alkyl groups from one or more 2,2,4,4-tetraalkyl-1,3-cyclobutanediols may include $C_{1-8}$, (e.g., methyl, ethyl). The cis/trans cyclobutyl ring isomers, based on the relative positions of the hydroxyl groups, may range from a ratio of about 33:67 to about 67:33.

In some embodiments, described copolyesters may be prepared by condensation polymerization which can be carried out by transesterification polycondensation or dehydrative polycondensation. In transesterification polycondensation, the diol is reacted with a dicarboxylate diester in the presence of a catalyst. In dehydrative polycondensation, the diol is reacted with a dicarboxylic acid, optionally in the presence of a catalyst.

There are many suitable catalysts for the polycondensation reaction. Catalysts may include compounds and salts of alkali and alkaline earth metals such as sodium and calcium. Catalysts may include first row transition metals such as titanium, manganese, cobalt and zinc. Catalysts may include Group IIA-VA elements such as antimony, tin, lead and germanium. Catalysts may include inorganic and organic acid catalysts such as phosphoric acid and toluene sulfonic acid.

The catalysts for preparation of the copolyesters described herein may include compounds of tin, manganese, zinc, cobalt and titanium. Tin catalysts, alone or in combination with a cocatalyst, may be employed due to the faster reaction rate with the cyclobutanediol and formation of low-color copolymers with 1,3-propanediol or 1,4-butanediol. Examples of tin catalysts include dibutyltin oxide, tin acetate, tin oxalate, dibutyltin dimethoxide, tin isopropoxide, tributyltin acetate, dioctyltin oxide, dimethyltin dichloride, triphenyltin acetate, tin amyloxide, dibutyltin bis(2-ethylhexanoate), dibutyltin dilaurate, tin chloride, potassium tin oxide, tin oxide, bis(tributyltin oxide) and the like.

Transesterification copolycondensation may be carried out by heating excess diols with dicarboxylate diester and catalyst at a temperature sufficient to distill off the alcohol (e.g., methanol, ethanol, phenol) derived from the ester and then applying sufficient vacuum and heat to distill off the excess diol. In the case of the cyclobutanediol copolyesters described herein, the reaction may be initially heated during the first stage between about 180° C. to about 250° C., in which about 70% or more of the corresponding alcohol is removed. For the second (e.g., vacuum) stage temperatures above about 250° C. may be employed once the vacuum is reduced to below about 1 mm Hg or to below about 0.5 mm Hg. The copolymerization may be carried out batchwise in a conventional reactor or continuously as in an extruder.

The transesterification copolycondensation may be conducted in various ways, including first reacting the cyclobutanediol and diester with tin catalyst, then adding 1,3-propanediol and/or 1,4-butanediol and an optional catalyst such as titanium butoxide followed by the vacuum step; and reacting cyclobutanediol, 1,3-propanediol and/or 1,4-butanediol and diester with a tin catalyst or a tin/titanium catalyst followed by the vacuum step.

The desired molar ratio of cyclobutanediol ("CBDO") to 1,3-propanediol and/or 1,4-butanediol in the polymer may be obtained by adjusting the initial monomer charge. This CBDO/diol molar ratio in the polymer has been found to closely match the CBDO/diol molar ratio charged to the reactor. Excess diol (cyclobutanediol plus 1,3-propanediol and/or 1,4-butanediol) may be desirable in the initial stages of the polymerization. The excess of diols to diester is generally within the range of about 5 to about 150% or more, from about 10 to about 100%, or from about 20 to about 30% moles per mole diester. Excess diols are removed at the later stages of the process to obtain high molecular weight polymers.

For dehydrative polycondensation, the reaction temperature is generally above 200° C. or above 250° C. The initial stages of the reaction may be conducted under pressure so as to avoid loss of monomers. Generally, an excess of diols of about 2 to about 30 mole % may be used.

During the polymerization reaction, stabilizers and other additives may be present during the reaction or added to the polymer.

The term "amorphous" generally refers to copolymers that do not exhibit a distinct melting point (by differential scanning calorimetry at 10° C./min.) after being molded under typical molding conditions. Copolyesters described herein may be soluble at room temperature in chlorohydrocarbon solvents such as methylene chloride and chloroform. By contrast, the homopolyesters of 2,2,4,4-tetramethyl-1,3-cyclobutanediol, 1,3-propanediol ("PDO") and 1,4-butanediol ("BDO") and certain crystalline CBDO/PDO and CBDO/BDO copolymers are generally not soluble to an appreciable degree in these solvents. The amorphous polymers described herein may be generally transparent or slightly opaque glasses, while crystalline or crystallizable polymers are generally noticeably opaque.

A benefit of the cyclobutanediol copolyesters containing 1,3-propanediol or 1,4-butanediol monomers is relatively low color, as compared with ethylene glycol-containing cyclobutanediol copolyesters, which tend to test high on the yellowness index (ASTM D-1925) as measured on ⅛" disks (see Table 2 of Example 3). The invention copolymers preferably exhibit yellowness indexes less than about 50 or less than about 20. The copolyesters described herein may have high molecular weights, typically reflected in an intrinsic viscosity (IV) (in hexafluoroisopropanol at room temperature) of at least about 0.5 or about 0.6 to about 1.0. Copolyesters described herein may have notched izod impacts (⅛" thickness) of greater than about 2 or greater than about 3 ft-lb/in, and glass transition temperatures greater than about 80° C. or greater than about 100° C.

The examples clearly show that the CBDO copolymers display self healing and shape memory properties when heated above their glass transition temperature (Tg).

Also, it has been discovered that the cis:trans isomer content of the CBDO copolymer product affects the resulting self healing and shape memory as well. As the examples below will show, applicants tested two materials made according to the U.S. Pat. No. 5,705,575. In one, the cis:trans isomer ratio was 46/54 percent. Another had a cis:trans isomer ratio of 18/82 percent.

The examples clearly show that the superior self healing and shape memory were only observed in the polymer containing the higher cis:trans ratio. The useful copolymers of the invention are those wherein the cis isomer is present in an amount effective to yield a high level of self healing and shape memory when treated similarly to Example 1. This amount of cis isomer is referred to as "an effective amount of cis isomer."

EXAMPLE 1

A strand of CBDO copolymer was bent repeatedly at right angles to form a square coil. This coil was placed on the lab bench and gently heated with a heat gun. As the polymer reached a temperature just above its Tg it straightened and resumed its former shape.

EXAMPLE 2

An eighth inch thick plaque of CBDO copolymer was struck with a Garner impact tester. This left a hemispherical indention approximately 0.5 cm deep. The plaque was then heated with a heat gun until just above the copolymer's Tg at which time the indention disappeared and the plaque returned to its previous perfectly planar shape.

EXAMPLE 3

A plaque like the one in example 2 was scored with a stylus to leave a distinct scratch on the surface. The plaque was then heated with a heat gun to just above the Tg of the copolymer, and the scratch self healed and disappeared.

EXAMPLE 4

A strand of CBDO copolymer with a cis:trans isomer ratio of about 18:82 percent was treated as in Example 1. The sample, when bent at a right angle and then heated to above its Tg, recovered only 30% where higher cis containing polymer recovers 100% of its original shape.

What is claimed is:

1. A method, comprising:
   substantially deforming at least a portion of a product formed at least in part from at least one copolyester copolymer comprising cyclobutanediol such that the product changes from a first shape to a second shape; and
   heating the product to a temperature above its glass transition temperature such that the product changes from the second shape to substantially the first shape;
   wherein at least one copolyester copolymer comprising cyclobutanediol is an amorphous substantially linear polymer that is substantially uncrosslinked.

2. The method of claim 1, wherein substantially deforming at least a portion of the product comprises bending at least a portion of the product.

3. The method of claim 1, wherein substantially deforming at least a portion of the product comprises denting at least a portion of the product.

4. The method of claim 1, wherein substantially deforming at least a portion of the product comprises scratching at least a portion of the product.

5. The method of claim 1, wherein at least one copolyester copolymer comprising cyclobutanediol is produced by reacting at least: at least one aromatic dicarboxylic acid or an alkyl ester or anhydride thereof; at least one 2,2,4,4-tetraalkyl-1,3-cyclobutanediol; and at least one of 1,3-propanediol and 1,4-butanediol under polycondensation reaction conditions in the presence of a polycondensation catalyst.

6. The method of claim 5, wherein the 2,2,4,4-tetraalky1-1,3-cyclobutanediol is 2,2,4,4-tetramethyl-1,3-cyclobutanediol.

7. The method of claim 5, wherein the polycondensation catalyst is a tin compound.

8. The method of claim 5, wherein the aromatic dicarboxylic ester is dimethyl terephthalate and the 2,2,4,4-tetraalkyl-1,3-cyclobutanediol is 2,2,4,4-tetramethyl-1,3-cyclobutanediol.

9. The method of claim 1, further comprising heating the product to a temperature above its glass transition temperature to impart self healing properties to at least a portion of the product.

10. The method of claim 1, further comprising heating the product to a temperature above its glass transition temperature to impart shape memory properties to at least a portion of the product.

* * * * *